United States Patent [19]

Holmes et al.

[11] Patent Number: 4,902,375

[45] Date of Patent: Feb. 20, 1990

[54] APPARATUS FOR ASSEMBLING A CONTINUOUS STREAM OF COMPOSITE LABELS

[75] Inventors: Terry L. Holmes, Monona; Daniel A. Thiemann, Windsor; Charles Schroeder, deceased, late of Madison, all of Wis., by Ruth Schroeder, administrator

[73] Assignee: Oscar Mayer Foods Corporation, Madison, Wis.

[21] Appl. No.: 868,214

[22] Filed: May 28, 1986

[51] Int. Cl.[4] .............................................. B32B 31/04

[52] U.S. Cl. .................................... 156/516; 156/256; 156/267; 156/517; 156/519; 156/552; 156/556

[58] Field of Search ............... 156/297, 267, 519, 516, 156/517, 521, 539, 540, 541, 543, 556, 557, DIG. 28, DIG. 38, DIG. 40, DIG. 42

[56] References Cited

U.S. PATENT DOCUMENTS

| | | | |
|---|---|---|---|
| 2,744,562 | 5/1956 | Rocca et al. | 156/556 |
| 3,540,970 | 11/1970 | Huntwork | 156/556 |
| 3,986,441 | 10/1976 | Jaton | 156/556 |
| 4,493,743 | 1/1985 | Lunding | 156/556 |
| 4,606,715 | 8/1986 | Larson | 156/556 |
| 4,680,080 | 7/1987 | Instance | 158/552 |

*Primary Examiner*—Caleb Weston

*Attorney, Agent, or Firm*—Joseph T. Harcarik

[57] ABSTRACT

An apparatus and method are provided for assembling composite labels including a label or a seal at least partially covering a ribbon segment. A stream of ribbon segments are severed from a length of ribbon, are spaced from each other, and are transported to a location at which they are positioned at least partially under a seal or label and onto a moving web of backing material in order to form the composite product.

12 Claims, 5 Drawing Sheets

FIG-8-
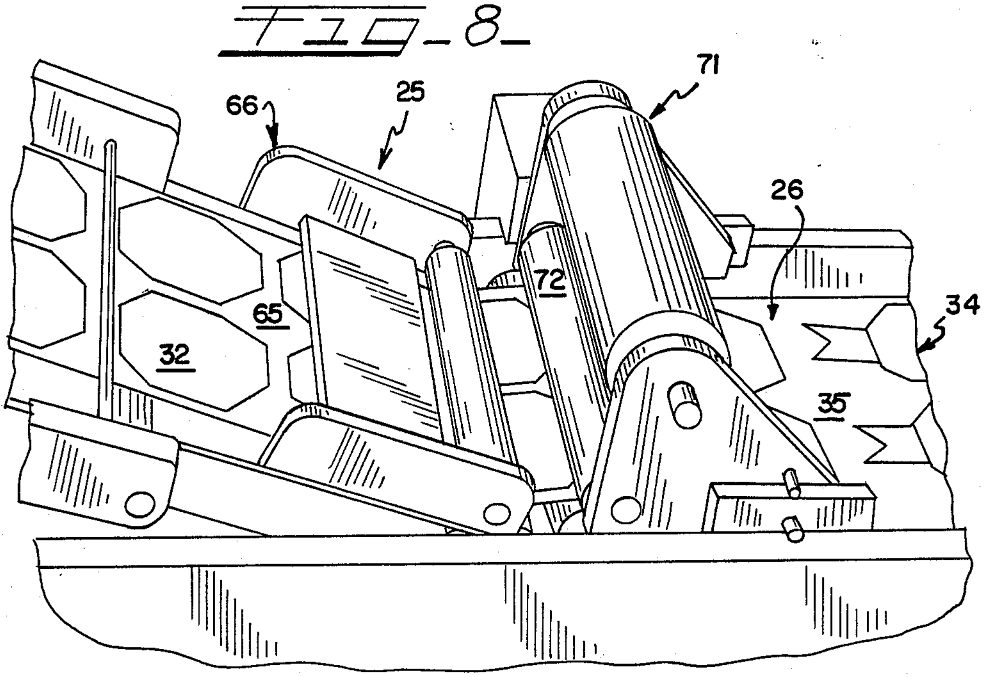
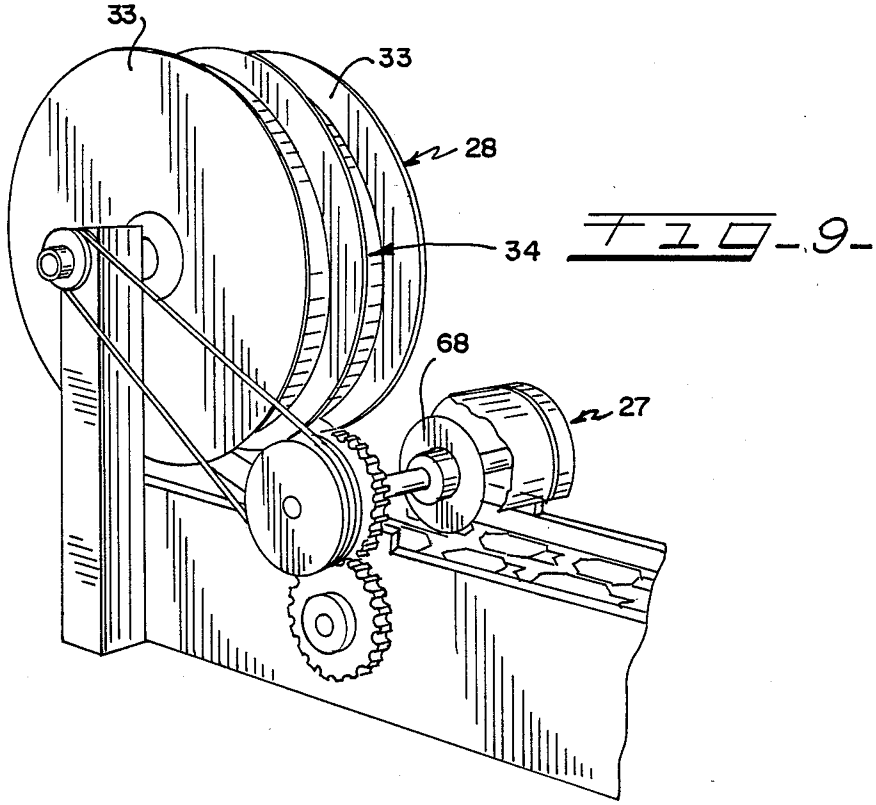
FIG-9-

APPARATUS FOR ASSEMBLING A CONTINUOUS STREAM OF COMPOSITE LABELS

BACKGROUND AND DESCRIPTION OF THE INVENTION

The present invention generally relates to the assembly of composite labels, more particularly to an apparatus and method for assembling a generally continuous stream of composite labels that include a ribbon segment and a seal or label peelably affixed to a backing web. A generally continuous stream of spaced ribbon segments are formed and directed to a location at which the ribbon segments are transferred, in conjunction with the transfer of adhesive-backed labels, onto a substantially continuous web of backing material in order to form the composite label products.

Various machines and devices are available for applying adhesive-backed labels and the like onto various surfaces, for example product packages. A typical product application in this regard is the affixation of decorative and/or informational labels or seals onto retail packages. Included in this regard are decorative and promotional seals in the nature of those that connote approval, certification, award reception and the like in order to provide the retail package with a distinctive appearance that indicates a high quality product.

Such types of decorative, promotional and informational labels or seals convey an enhanced degree of distinctiveness and eye appeal when they include a component having a texture noticeably different from that of a cellulosic or paper type of label. These distinctive components typically will have a more porous texture or surface than cellulosic components, which increases the difficulty with which such components are handled. For example, porous textured components such as ribbons are difficult to accurately and consistently transport, they are not efficiently lifted by vacuum devices, and they are not especially well adapted to receive coatings of adhesive. A particularly troublesome composite label or seal in this regard is one that is in the nature of a cellulosic seal having a ribbon protruding therefrom. Typically, composite labels or seals of this type are applied by hand to the retail package or the like, often as two separate components that are combined into the composite label or seal at the time of their respective application to the package.

There is accordingly a need for a means by which a composite label or seal can be assembled on a generally continuous and automated basis and in a form by which the thus assembled composite seal can be readily applied in automated fashion onto a retail product package and the like. Such a need is fulfilled by the present invention by virtue of which composite labels are formed from a roll of ribbon and from a web of labels that are manipulated and presented to a transfer assembly which positions a ribbon segment below at least a portion of a label while positioning the label onto a generally continuous web of backing material in order to form a series of composite labels or seals on the backing material web.

It is accordingly a general object of the present invention to provide an improved arrangement for assembling composite labels or seals.

Another object of the present invention is to provide an improved apparatus and method which operate in automated manner in order to combine a ribbon segment with an adhesive-backed cellulosic label.

Another object of this invention is to provide an improved apparatus and method for supplying composite labels in a form that is suitable for automated application onto a stream of items.

These and other objects, features and advantages of this invention will be clearly understood through a consideration of the following detailed description.

BRIEF DESCRIPTION OF THE DRAWINGS

In the course of this description, reference will be made to the attached drawings, wherein:

FIG. 8 is a perspective view of the assembly shown in FIG. 6 during a seal application stage thereof; and FIG. 9 is a perspective view of a backing material web slitting and take-up assembly.

DESCRIPTION OF THE PARTICULAR EMBODIMENTS

Figure 2:
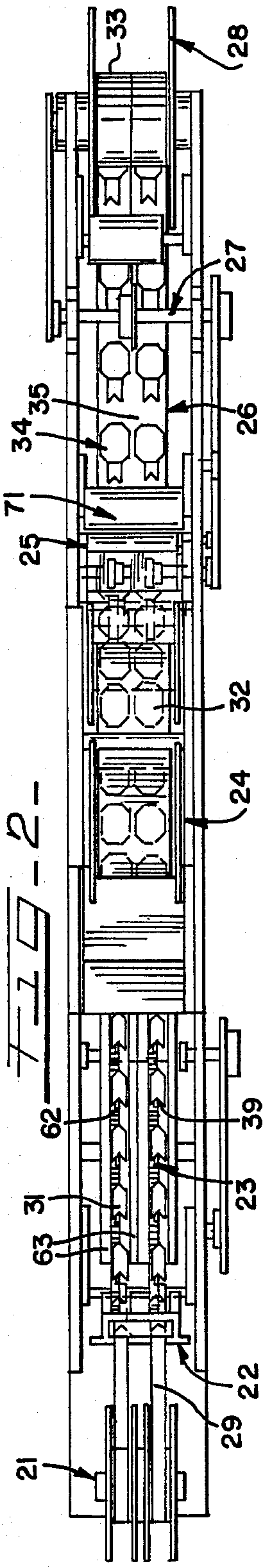
FIG. 2 is a top plan view of the apparatus illustrated in FIG. 1.
Figure 1:
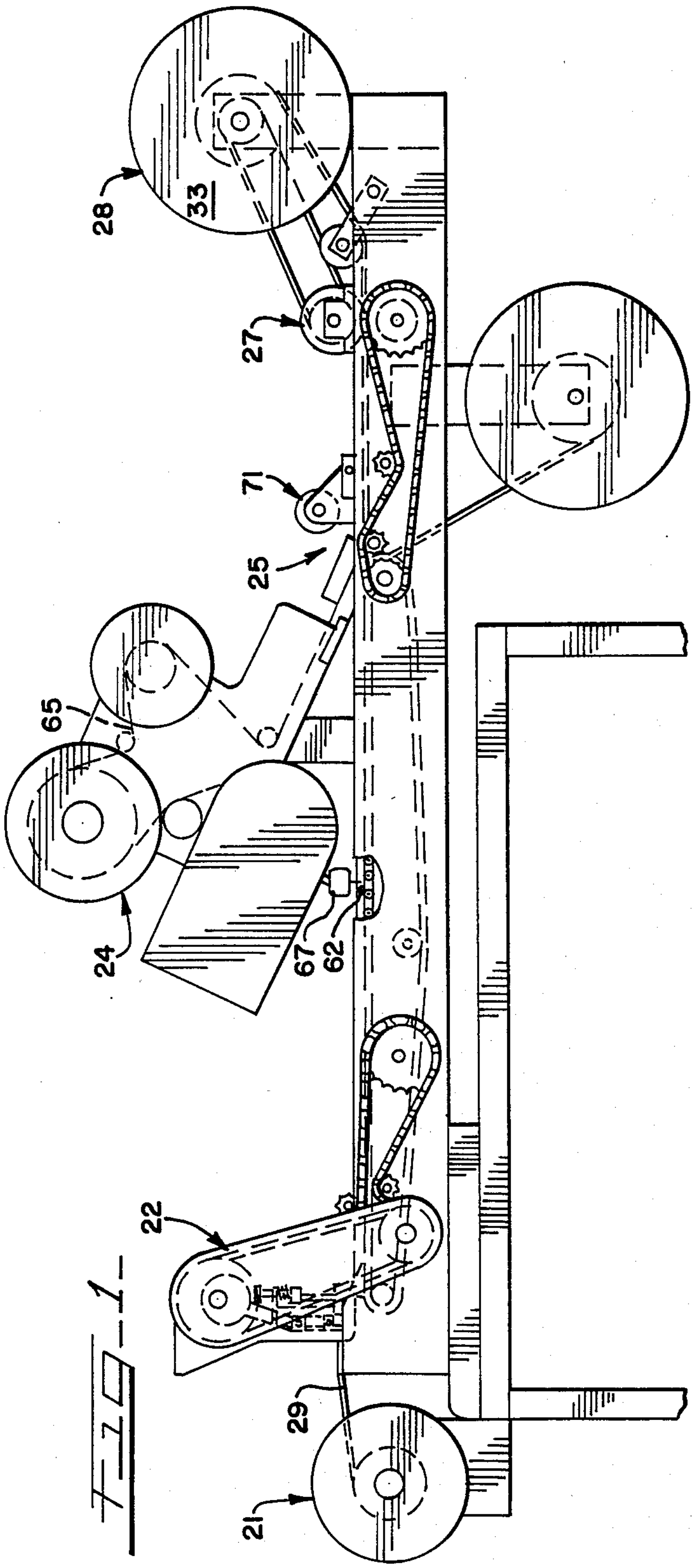
FIG. 1 is an elevational view of a preferred embodiment of the apparatus according to this invention.

The apparatus illustrated in FIGS. 1 and 2 includes a ribbon supply assembly 21, a ribbon cutting and depositing assembly, generally illustrated as 22, a ribbon segment conveying assembly 23, a label stream supplying assembly, generally designated as 24, a transfer assembly, generally designated as 25, a backing web support and supplying assembly, generally designated as 26, a backing web slitting assembly, generally designated as 27, and a composite take-up assembly 28. One or more lengths of ribbon 29 are fed to the ribbon cutting and depositing assembly 22 in order to form a continuous stream of ribbon segments 31 that are fed to the transfer assembly 25. Label stream supplying assembly 24 directs a plurality of seals or labels 32 to the transfer assembly 25. The backing web slitting assembly 27, when provided, longitudinally severs multiple-lane composite items into a single row web for subsequent application onto a stream of items (not shown), which single row composite product can be conveniently stored on a spool 33 of the composite take-up assembly 28. Composite product 34 includes a ribbon segment 31, at least partially under a seal or label 32 adhered to a backing web 35.

Figure 3:
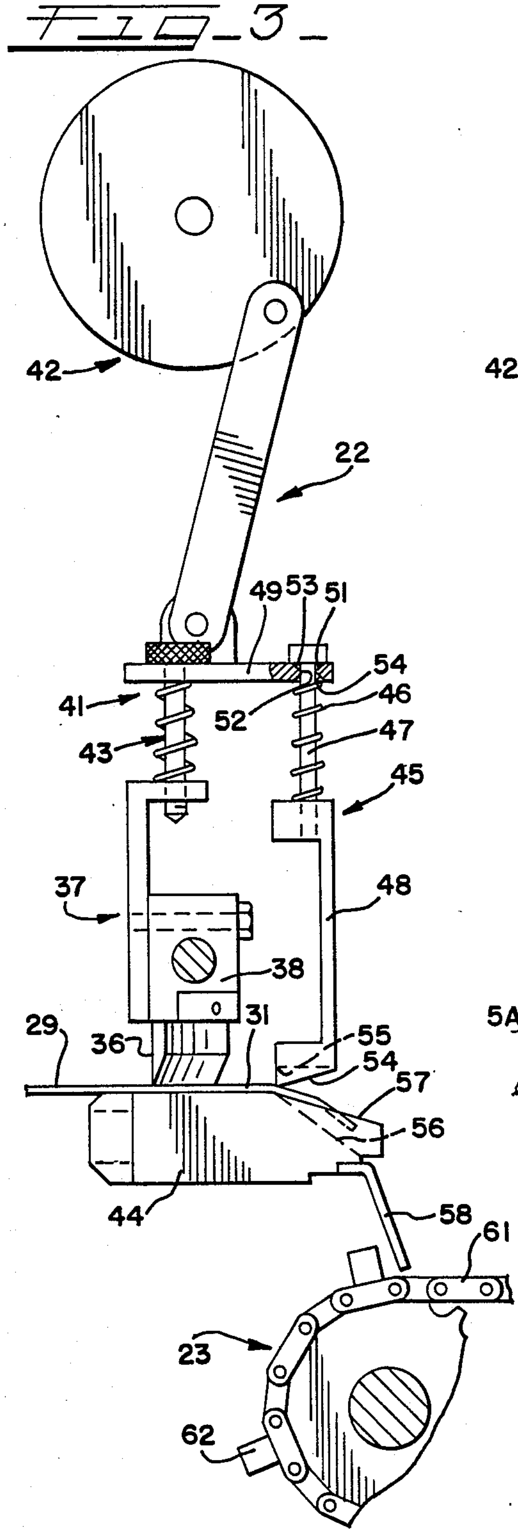
FIG. 3 is a detail view of a preferred ribbon cutting and delivery assembly illustrating its position generally associated with ribbon severance.
Figure 4:
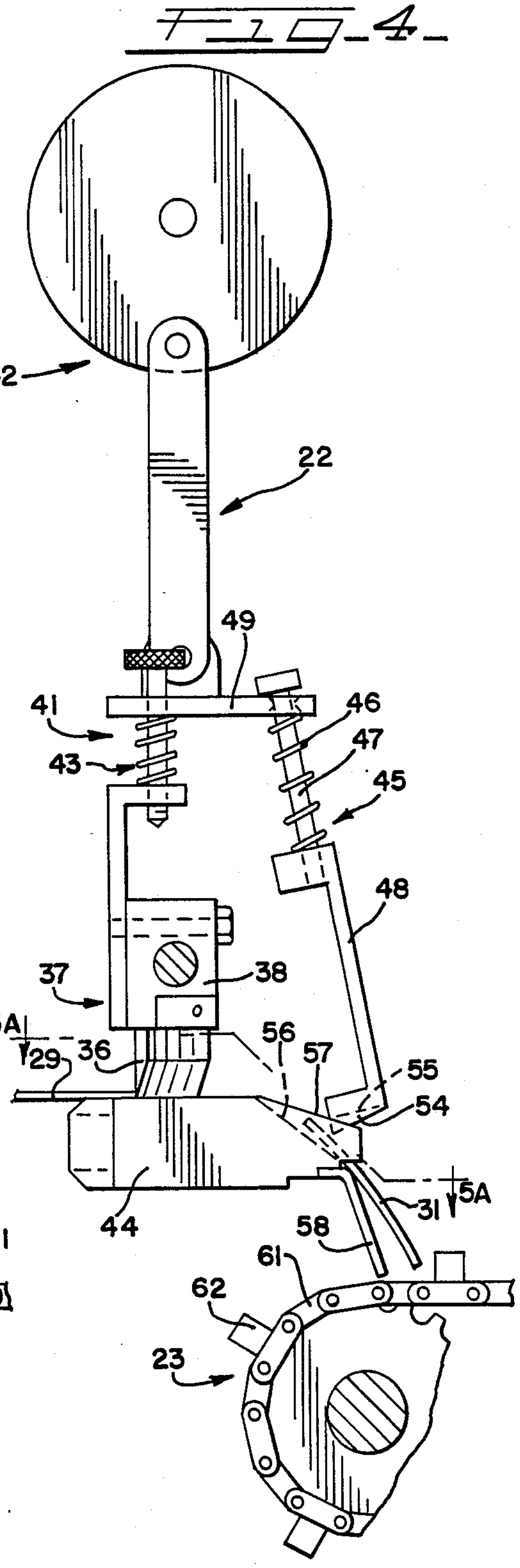
FIG. 4 is a detail view of the ribbon cutting and delivery assembly of FIG. 3 illustrating its position shortly after ribbon severance, and further illustrating post-severance movement of a ribbon segment.
Figure 5A:
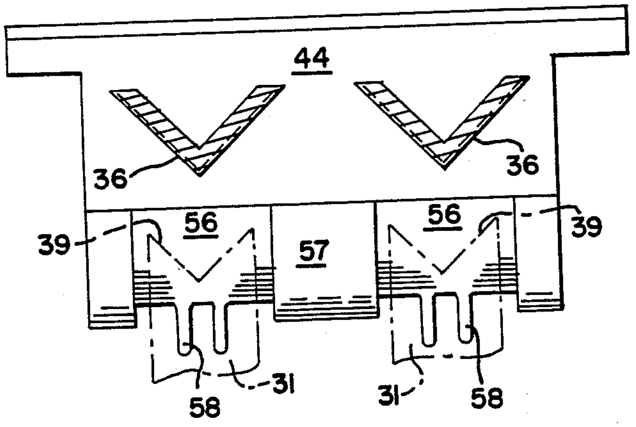
FIG. 5A is a sectional view along the line 5A—5A of FIG. 4.

With reference to FIGS. 3, 4, 5 and 5A, the ribbon cutting and depositing assembly 22 includes one or more blades 36 mounted within and depending from a heater assembly 37, including a heater block 38 which imparts heat energy to each blade 36 in order to enhance the ability of each blade 36 to sever the length of ribbon 29 in a generally known manner. Blades 36 may be shaped so as to provide the length of ribbon 29 with a severance edge having any one of a variety of shapes. In the illustrated embodiment, each blade assembly 36 is generally V-shaped in cross section, as generally illustrated in FIG. 5A, with the result that the length of ribbon 29 is severed into ribbon segments 31, each having a notch 39 in its trailing end.

Heater assembly 37 and blades 36 are supported by a carriage assembly 41 that moves in a generally vertical direction by operation of a suitable camming assembly 42. Camming assembly 42 and carriage assembly 41 cooperate in a generally known manner to impart movement of each blade 36 into and out of severing engagement with the length of ribbon 29. An accommodation assembly, such as the illustrated spring and rod assembly 43 permits continued downward movement of the carriage assembly 41 after each blade 36 has severed the length of ribbon 29 and has engaged anvil 44. This accommodation assembly cooperates with a pusher assembly 45 in order to actively direct each severed ribbon segment 31 off of the anvil 44 and onto the ribbon segment conveying assembly 23.

With more particular reference to the pusher assembly 45, such includes an accommodation assembly including, for example, the illustrated spring 46 and support rod 47. Also included is a pusher member 48. The accommodation assembly permits substantially arcuate or swinging movement of the pusher assembly 45 generally between the position of the pusher assembly 45 that is illustrated in FIG. 3 and that is shown in FIG. 4. Such arcuate movement is preferably facilitated by providing a lever and fulcrum mounting arrangement by which the pusher assembly 45 is mounted onto the carriage assembly 41. In the illustrated embodiment, this lever and fulcrum arrangement includes the support rod 47 which functions as a lever in association with a fulcrum member within a support bracket 49 of the carriage assembly 41. The fulcrum member that is illustrated takes the form of a bore 51 having an annular apex or chamfer 52 that engages the support rod 47. During the arcuate movement of the pusher assembly 45, each support rod 47 rocks on one of the chamfers 52, such arcuate movement being facilitated by the upper inside section 53 of the bore 51 and the lower outside section 54 of the bore 51.

Figure 5:
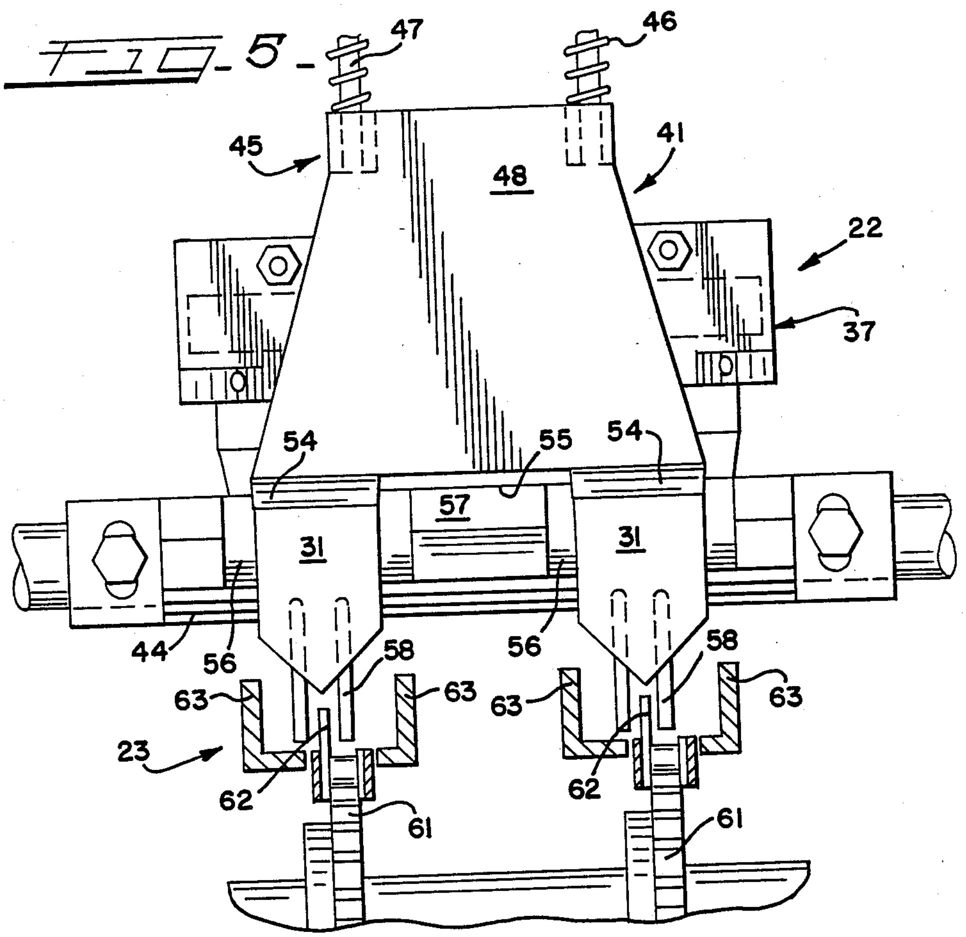
FIG. 5 is a front elevational view of the ribbon cutting and delivering assembly.

Pusher member 48 includes a foot 54 that generally downwardly projects from the pusher member 48. Two such feet 54 are illustrated in FIG. 5. Positioned between these illustrated feet 54 is a stop surface 55 that is recessed or upwardly positioned with respect to each foot 54. The anvil 44 includes a detent or chute 56 for accommodating each foot 54 during the arcuate or swinging movement of the pusher assembly 45. Anvil 44 also includes a runway 57 for sliding engagement with the stop surface 55.

In operation, the anvil 44, carriage assembly 41 and pusher assembly 45 cooperate in order to sever a ribbon segment 31 from the length of ribbon 29 and to actively engage the thus formed ribbon segment 31 and direct same off of the anvil 44 and onto the ribbon segment conveying assembly 23. Referring to FIG. 3, at substantially the same time that the blades 36 have severed or have substantially severed a ribbon segment 31 from the length of ribbon 29, the foot 54 engages the ribbon segment 31 at a location generally shown in FIG. 3. Camming assembly 42 continues to move the carriage assembly 41 generally downwardly, and the foot 54 begins to slidingly move into the detent or chute 56, with the recently severed ribbon segment 31 being positioned between the detent or chute 56 and the leading edge of the foot 54. As this movement continues, the foot 54 slidingly moves the ribbon segment 31 away from the blades 36 and from the top surface of the anvil 44 and into the detent or chute 56 until the ribbon segment 31 is moved to a location as generally shown in FIG. 4. At that time, the leading edge of the stop surface 55 engages the runway 57 as generally shown in FIG. 4. Due to the shallower slope of the runway 57 when compared with the detent or chute 56, the continued sliding engagement of the stop surface 55 with the runway 57 causes the leading edge of the foot 54 to disengage the ribbon segment 31 in order to allow its free fall onto the ribbon segment conveying assembly 23.

Guide tines 58 or the like can be provided in order to control such free fall of the ribbon segment 31 onto the ribbon segment conveying assembly 23. At this time, the camming assembly 42 moves the carriage assembly 41 generally upwardly, at which time the pusher assembly 45 proceeds through return arcuate movement, which is conveniently assisted or effected by engagement of a portion of the spring 46, which is in a generally biased or compressed state at this time, with the undersurface of the support bracket 49. Continued generally upward movement of the carriage assembly 41 lifts the blades 36 off of the anvil 44 in order to provide clearance that is adequate to accommodate passage of the length of ribbon 29 between the blades 36 and the anvil 44. At this time, the ribbon cutting and depositing assembly 22 has completed a cycle and is in a position to repeat its cycle.

Ribbon segment conveying assembly 23 receives each ribbon segment 31 onto its endless surface 61, the deposit thereon being in timed sequence such that the notch 39 of each ribbon segment 31 generally engages an upstanding pin 62. By this arrangement, a generally continuous stream of ribbon segments are provided on the ribbon segment conveying assembly 23, such having a predetermined spacing therebetween. A plurality of guide rails 63 may be provided on the endless surface 61 in order to assist in maintaining the desired spacing and location of the flow of ribbon segments 31.

Label stream supplying assembly 24 handles, in a generally known manner, a continuous web of backing material 65 having a series of seals or labels 32 affixed thereto or placed thereon according to a known or predetermined spacing between the labels 32. Label stream supplying assembly 24 includes an articulated section 66 of generally known construction that directs the leading edge of the backing web 65 to a desired location and manipulates same such that the seal or label 32 will separate from the backing web 65 and, in association with its engagement with the moving backing web 35, peel the seal or label 32 off of the continuous web 65 and onto the backing web 35. Backing web support and supplying assembly 26 provides the flow of backing web 35 to the transfer assembly 25 and moves the upper surface of the backing web 35 away from the transfer assembly 25, the ribbon segment conveying assembly 23, and the articulated section 66 of the label stream supplying assembly 24. After the seals or labels 32 have been removed from the web 65, such web 65 can be transferred to the backing web support and supplying assembly 26 for use as the backing web 35.

Figure 6:
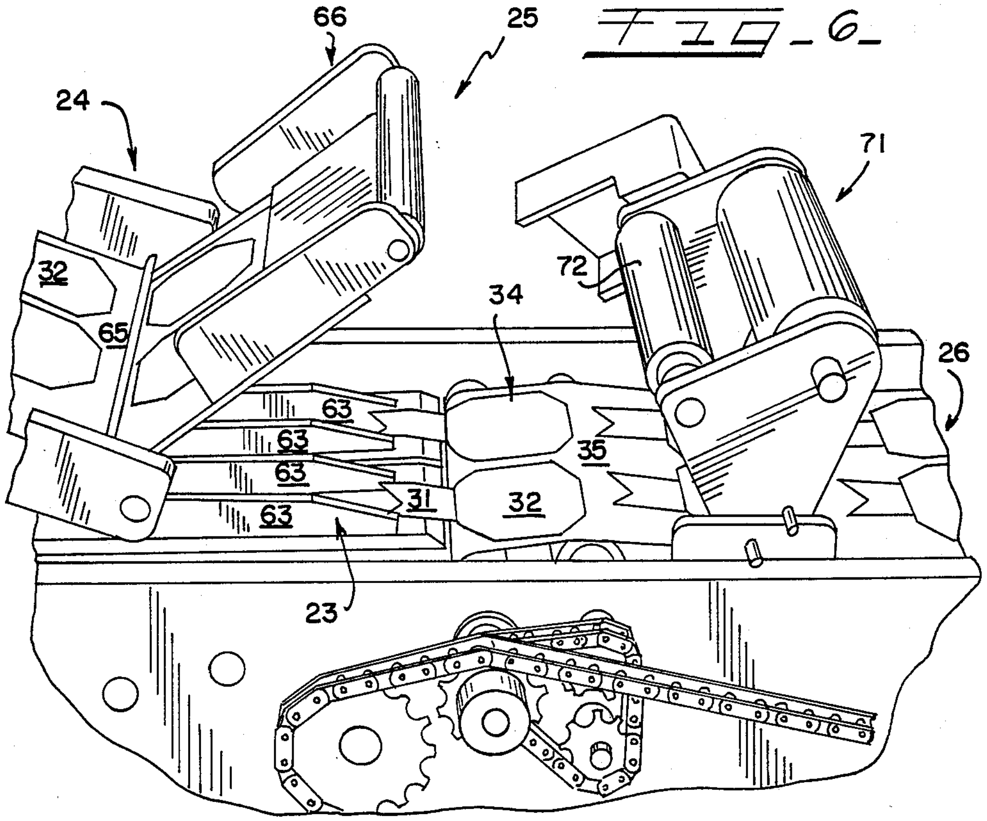
FIG. 6 is a perspective view of a preferred transfer and composite formation assembly of the illustrated apparatus.
Figure 7:
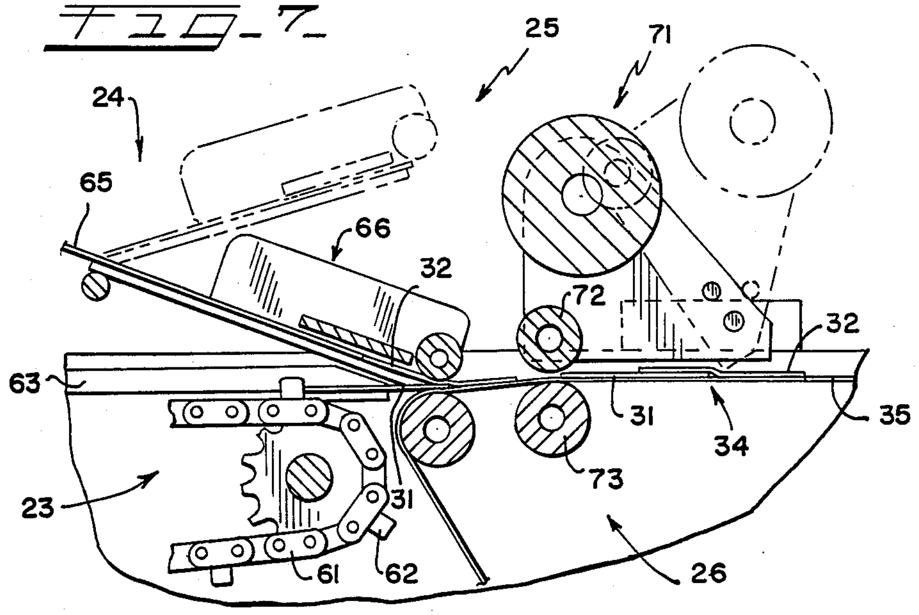
FIG. 7 is an elevational view of the assembly illustrated in FIG. 6.

With more particular reference to the transfer assembly 25, specific reference is made to FIGS. 6, 7 and 8, which illustrate the operation of the transfer assembly 25, as a result of which a composite product 34 is made by applying a seal or label 32 onto the moving backing web 35 in timed sequence with positioning a ribbon segment 31 under at least a portion of the seal or label 32 as it is being deposited on and affixed to the moving backing web 35. The interaction of these various components is timed and sequenced as follows.

Initially, the leading portion of the seal or label 32 engages and, due to the presence of pressure-sensitive adhesive or the like at the interface between the seal or label 32 and the backing web 35, the leading portion of the label 32 generally adheres to and moves with the backing web 35 at a time that the trailing portion of the label 32 is at a level above its leading portion, such being the orientation generally shown in FIG. 8 and in solid lines in FIG. 7. At this time, the ribbon segment conveying assembly 23 inserts the leading portion of a ribbon segment 31, typically including pushing action of an upstanding pin 62 onto the trailing portion of this ribbon segment 31. At the orientation generally shown in solid lines in FIG. 7, the leading portion of the ribbon segment 31 has engaged the backing web 35 and the seal or label 32 so as to be generally wedged therebetween, preferably in association with pressure sensitive adhesive contact of the ribbon segment 31. Continuation of the respective movements of these various components results in the formation of the composite product 34, at which time the articulated section 66 can be raised to the orientation shown in FIG. 6 and in phantom in FIG. 7.

With more particular reference to the timing achieved in association with the transfer assembly 25 and the composite product forming procedure accomplished thereby, the operation of the ribbon cutting and depositing assembly 22, the ribbon segment conveying assembly 23 and the backing web support and supplying assembly 26 can, in accordance with the illustrated embodiment, all be driven at predetermined speeds that are in a generally constant relationship with each other. In the illustrated embodiment, this is accomplished by having their respective drive assemblies mechanically interconnected by the illustrated chain drives and the like. Other means for accomplishing this purpose can be provided, such as a line shaft, a microprocessor controlled drive system, and the like.

Typically, in order to minimize the cost of the supply of seals or labels 32 on the backing web 65, such seals or labels 32 are closely spaced from each other in a longitudinal direction. Usually, this longitudinal spacing is not adequate to accommodate the protruding portion of the ribbon segment 31 of each composite product 34 and the longitudinal spacing thereof that is present on the backing web support and supplying assembly 26. Accordingly, there is usually a need for increasing the pitch between the seals or labels 32 while still maintaining the timed sequence that is characteristic of this invention. The illustrated approach for achieving this objective is the use of a trip switch 67 or the like (FIG. 1) that engages each upstanding pin 62 of the ribbon segment conveying assembly 23. Activation of the trip switch 67 directs the label stream supply assembly 24 to initiate deposit of a seal or label 32 onto the backing web 35 in the manner discussed herein.

In order to increase the efficiency of the present apparatus, it is advantageous to provide multiple and simultaneous operational functions or components in side-by-side relationship. The illustrated embodiment depicts double side-by-side components in this regard. Additional multiple components can be provided as desired. When such multiple components are provided, it may be necessary to separate the resulting multiple streams of composite products 34 in those instances where the means by which the composite products are applied to the retail package or the like will accommodate but a single row of composite products. In that instance, the backing web slitting assembly 27 can be provided, by virtue of which a suitable mechanism such as the illustrated circular blade 68 is provided in order to longitudinally slit the backing web 35 to thereby form a single file stream of composite products 34. Slitting assembly 27 can likewise be driven, as illustrated, by the primary drive assembly of the apparatus, which likewise can drive each of the take-up spools 33.

In order to facilitate proper and consistent formation of the composite products 34 at the transfer assembly 25, a pressure application assembly 71 can be included. Preferably, the pressure application assembly 71 includes a resilient or "soft" roller 72 which engages each just formed composite product 34 in order to compress same, typically in association with a suitable support such as the illustrated nip roller 73. By providing the roller 72 with a generally soft consistency, the roller 72 can more effectively form or mold the seal or label 32 over the ribbon segment 31 in order to improve the assembly of the composite products 34 and in order to enhance the textured appearance of the composite products 34. Roller 72 can move into and out of its compression imparting position as generally illustrated in phantom in FIG. 7.

It will be understood that the embodiments of the present invention which have been described are illustrative of some of the applications of the principles of the present invention. Numerous modifications may be made by those skilled in the art without departing from the true spirit and scope of the invention.

We claim:

1. An apparatus for assembling a continuous stream of composite labels, comprising:

means for supporting and conveying a substantially continuous web of backing material, said backing material supporting and conveying means having an upstream end portion and a downstream area;

means for cutting a length of ribbon into ribbon segments and for depositing said ribbon segments into a substantially continuous stream of spaced ribbon segments, said ribbon segment depositing means includes pusher assembly means for engaging and moving each ribbon segment between said ribbon cutting means and toward a ribbon segment conveying assembly;

said ribbon segment conveying assembly including means for supplying said substantially continuous stream of spaced ribbon segments toward said upstream end portion of the backing material supporting and conveying means, said ribbon segments supplying means having an off-feed end;

means for supplying a substantially continuous stream of spaced labels toward said upstream end portion of the backing material supporting and conveying means, said labels supplying means having an off-feed end; and transfer means for operatively connecting together said off-feed end of the ribbon segments supplying means, said off-feed end of the labels supplying means and said upstream end portion of the backing web supporting and conveying means, said transfer means further being for positioning one of said ribbon segments below at least a portion of one of said labels while positioning said label onto said web of backing material in order to thereby form on said backing web a composite label product of ribbon segment at least partially under the label.

2. The apparatus according to claim 1, further including a backing web slitting assembly at the generally downstream area of the backing web supporting and conveying means.

3. The apparatus according to claim 1, wherein said ribbon cutting means includes a generally V-shaped blade for forming the ribbon segments into a shape having a notch in its trailing end.

4. The apparatus according to claim 1, wherein said ribbon segment depositing means includes means for initiating gravity-controlled deposit of each ribbon segment onto a ribbon segment conveying assembly.

5. The apparatus according to claim 1 further including a pressure application assembly having a soft roller, said pressure application assembly being generally at said transfer means.

6. The apparatus according to claim 1, wherein said pusher assembly includes means for effecting sliding movement of each ribbon segment between a pusher member thereof and a portion of an anvil of the ribbon segment supplying means.

7. The apparatus according to claim 6, wherein said portion of the anvil includes a chute through which the ribbon segment passes.

8. The apparatus according to claim 6, wherein said pusher means includes a pusher member having a generally downwardly projecting foot and a stop surface recessed with respect thereto, wherein said anvil includes chute means for generally slidingly engaging said foot with one of said ribbon segments therebetween, said anvil further including runway means for slidingly engaging said stop surface, and said runway means has a shallower slope than said chute means whereby said sliding engagement between the runway means and the stop surface disengages said generally sliding engagement between the chute means and the foot.

9. The apparatus according to claim 1, wherein said pusher assembly is generally swingingly mounted to a carriage assembly.

10. The apparatus according to claim 1, wherein said pusher assembly is generally swingingly mounted to a carriage assembly, and wherein said pusher assembly includes a pusher member that moves in a generally arcuate manner, said pusher member having a generally downwardly projecting foot and a stop surface recessed with respect thereto, wherein said anvil includes chute means for generally slidingly engaging said foot with one of said ribbon segments therebetween, said anvil further including runway means for slidingly engaging said stop surface, and said runway means has a shallower slope than said chute means whereby said sliding engagement between the runway means and the stop surface disengages said generally sliding engagement between the chute means and the foot.

11. The apparatus according to claim 1, wherein said ribbon segments supplying means includes a plurality of conveyed pins spaced from each other by a predetermined distance, said pins engaging the trailing end of said respective ribbon segments.

12. The apparatus according to claim 1, wherein said transfer means includes adhesive means for adhering a leading portion of each label to the conveyed web of backing material and for adhering the ribbon segment at least partially under the label.

* * * * *